United States Patent
Mishra et al.

(10) Patent No.: US 11,190,394 B2
(45) Date of Patent: Nov. 30, 2021

(54) SOFT-FAILURE PROTECTION FOR MULTICAST COMMUNICATIONS

(71) Applicant: Cisco Technology, Inc., San Jose, CA (US)

(72) Inventors: Mankamana Prasad Mishra, San Jose, CA (US); Ali Sajassi, San Ramon, CA (US); Krishnaswamy Muddenahally Ananthamurthy, San Ramon, CA (US); Samir Thoria, Saratoga, CA (US); Suma Kachinthaya, Dublin, CA (US); Swadesh Agrawal, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 154 days.

(21) Appl. No.: 16/599,010

(22) Filed: Oct. 10, 2019

(65) Prior Publication Data
US 2021/0111945 A1 Apr. 15, 2021

(51) Int. Cl.
*H04L 12/24* (2006.01)
*H04L 12/947* (2013.01)
*H04L 29/12* (2006.01)
*H04L 12/18* (2006.01)

(52) U.S. Cl.
CPC ........ *H04L 41/0668* (2013.01); *H04L 12/185* (2013.01); *H04L 49/25* (2013.01); *H04L 61/2069* (2013.01)

(58) Field of Classification Search
CPC combination set(s) only.
See application file for complete search history.

(56) References Cited

U.S. PATENT DOCUMENTS

| 8,774,181 B1 * | 7/2014 | Zhang | H04L 12/1886 370/390 |
|---|---|---|---|
| 10,855,579 B2 * | 12/2020 | Mishra | H04L 45/021 |
| 2011/0238793 A1 * | 9/2011 | Bedare | H04L 45/586 709/220 |
| 2018/0287946 A1 * | 10/2018 | Nagarajan | G06F 9/542 |

* cited by examiner

*Primary Examiner* — Xavier S Wong
(74) *Attorney, Agent, or Firm* — Lee & Hayes, P.C.

(57) ABSTRACT

In one embodiment, a first computer networking device executes an election algorithm to determine whether at least the first computer networking device or a second computer networking device is responsible for forwarding, to at least one receiving device, communications addressed to a specified group of computing devices. The first computer networking device may further store first data indicating that the first computer networking device is responsible for forwarding the communications. However, in response to the first computer networking device determining that it is no longer receiving the communications, it may store second data indicating that the first computer networking device is no longer responsible for forwarding the communications and may send, to the second computer networking device, third data indicating that the first computer networking device is not receiving the communications.

17 Claims, 10 Drawing Sheets

SOFT-FAILURE PROTECTION FOR MULTICAST COMMUNICATIONS

TECHNICAL FIELD

The present disclosure relates generally to techniques for ensuring that soft failures occurring between a source of multi-destination communications and a provider-edge router does not prevent customer-edge routers from receiving the multi-destination communications.

BACKGROUND

In today's digital world, more and more service providers manage and provide computing resources to users to fulfill needs of the users without the users having to invest in and maintain their own computing infrastructure. For example, cloud computing often involves the use of networks of data centers which house servers, routers, and other devices that provide computing resources to users such as compute resources, networking resources, storage resources, database resources, application resources, and so forth. Users may be allocated portions of the computing resources, including portions of one or more host servers that may provide compute functionality and one or more target servers that may provide storage for use by the host servers.

Within such data-center architectures, communications between computing devices are often routed through an array of switches, routers, and other computer networking devices. In some instances, these communications comprise group communications that are addressed to groups of destination computing devices, wherein each of these destination computing devices has previously subscribed to the group in order to receive the group communications. Within this architecture, a customer-edge (CE) router may be multihomed to several provider-edge (PE) routers to help ensure that the CE router receives the group communications in order to send these communications along to the subscribed destination computing devices. In some instances, however, a network failure may occur between one or more of the PE routers and a source of the group communications. Unfortunately, when this type of "soft failure" occurs, the CE router might not receive some of the group communications, resulting in traffic loss at the destination computing devices.

Therefore, it may be advantageous to ensure that these group communications are received at destination computing devices, even in the event of a soft failure occurring between one or more PE routers and the source of the communications.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
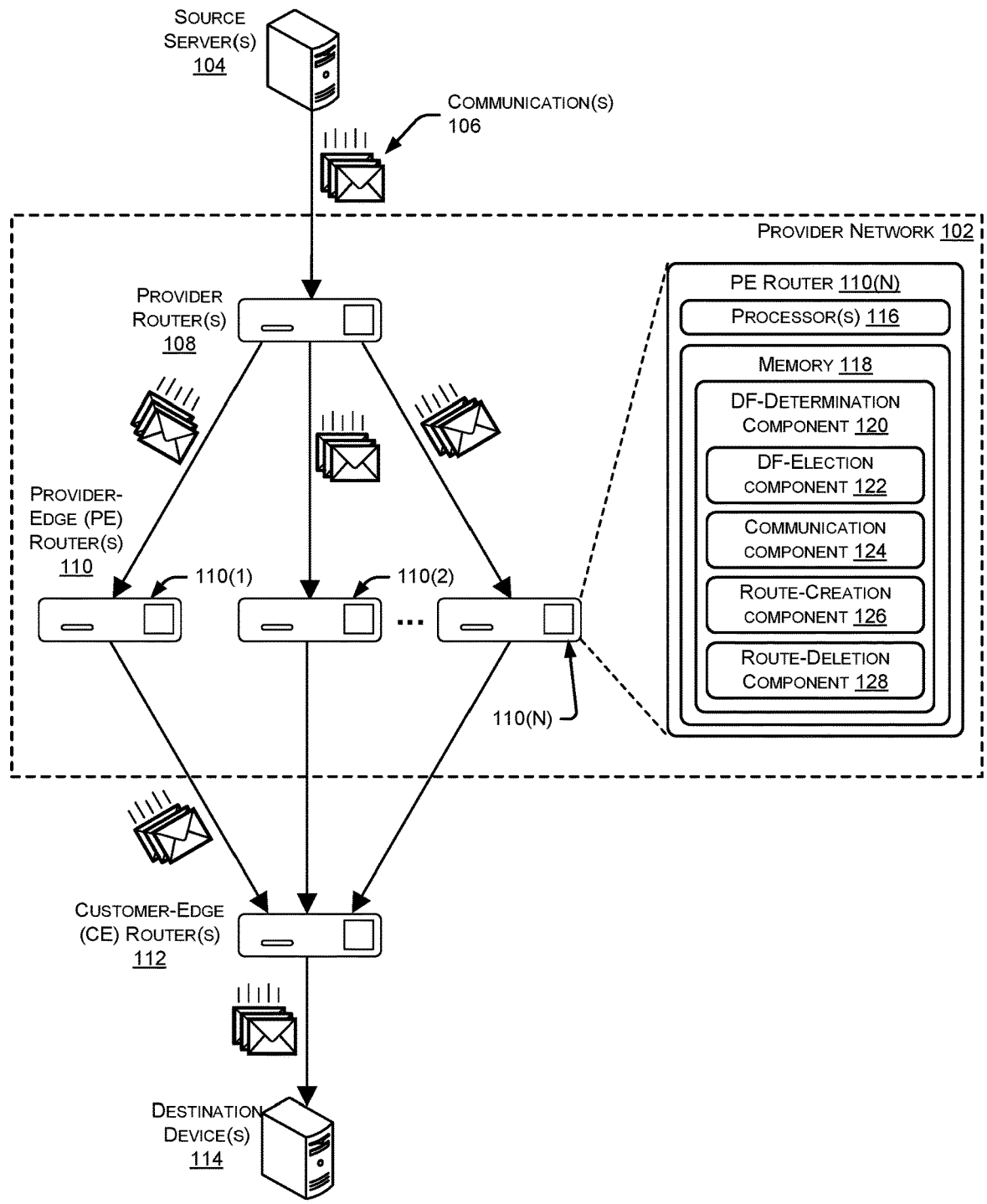
FIG. 1 illustrates a system-architecture diagram of an example environment in which computer networking devices route traffic, such as multicast traffic, within a provider network. As illustrated, one or more source servers may route this traffic through the provider network and to a customer-edge (CE) router, which in turn provides the traffic to one or more customer devices that have subscribed to receive the traffic. In this example, provider-edge (PE) routers that couple to the CE router and that receive the traffic have been configured to communicate amongst one another to ensure that the traffic reaches the CE router even in the event of a soft failure occurring upstream from one or more of the PE routers.

This disclosure describes, in part, a first computer networking device configured to execute an election algorithm for determining whether at least the first computer networking device or a second computer networking device is responsible for forwarding, to at least one receiving device, communications addressed to a specified group of computing devices. The first computer networking device may be further configured to store first data indicating that the first computer networking device is responsible for forwarding the communications to the at least one receiving device. Further, the first computer networking device may determine that the first computer networking device is not receiving the communications and may store second data indicating that the first computer networking device is no longer responsible for forwarding the communications to the at least one receiving device. Finally, the first computer networking device may send, to the second computer networking device, third data indicating that the first computer networking device is not receiving the communications.

This disclosure also describes, in part, a first computer networking device configured to execute an election algorithm for determining whether at least the first computer networking device or a second computer networking device is responsible for forwarding, to at least one receiving device, communications addressed to a specified group of computing devices. The first computer networking device may further store first data indicating that the first computer networking device is not responsible for forwarding the communications to the at least one receiving device. In addition, the first computer networking device may receive, from the second computer networking device, second data indicating that the second computer networking device is not receiving the communications, and may store third data indicating that the first computer networking device is now responsible for forwarding the communications to the at least one receiving device.

Additionally, the techniques described herein may be performed via a method and/or non-transitory computer-readable media storing computer-executable instructions that, when executed by one or more processors, performs methods described herein.

Example Embodiments

Typical data-center architectures include interconnected computer networking devices (e.g., switches, routers, etc.) configured to route immense amounts of traffic to other devices in the architecture. This traffic may include multicast traffic or other communications specifying respective identifiers of groups of computing devices. For example, these architectures may route traffic for a specified multicast group from a source to each destination device of a group of destination computing devices. In some instances, each destination device may subscribed to receiving communication from the source by subscribing to a particular internet protocol (IP) address associated with the multicast group, "(S,G)", where S represents the source of the communications and G represents identifier (e.g., IP addresses) of each receiving computing device that has subscribed to the group.

In some instances, communications from a source device are routed through a provider network and to customer-edge devices for distributing the communications to the destination devices. For example, the source device may send communications for a particular group to a provider router within the provider network, which may send the communications along to multiple provider-edge (PE) routers of the provider network, which in turn may send the communications to the appropriate customer-edge (CE) routers. The CE routers may then forward the communications on to the destination devices that have subscribed to the particular group.

In some instances, a CE router, behind which one or more destination devices reside, may be multihomed to several PE routers. Stated otherwise, two or more PE routers that communicatively couple to the CE router may receive traffic associated with a particular group that is routed to the CE router. At any given time, one of these multihomed PE routers may be associated with a "Designated Forwarder" (DF) role for a particular group, while the other PE routers may be associated with a "non-DF" (nDF) role for that particular. For example, a first PE router may be the DF router for one or more multicast groups and an nDF for other multicast groups, while a second PE router may be the DF router for one or more multicast groups and an nDF for other groups, and so forth.

When a PE router is the DF, the PE router may be responsible for forwarding the communications for the particular group to the CE router. The nDF router(s), meanwhile, may receive this same traffic, while refraining from forwarding the communications along to the CE router. If, however, a connection fails between the PE router playing the DF role and the CE router, another one of the PE routers with a viable connection to the CE router may become the DF router and, thus, forward along the communications to the CE router, thus avoiding traffic loss at the CE router and, ultimately, at the destination devices. While techniques exist for ensuring that this type of traffic loss does not occur when a connection fails between one of the multihomed PE routers and the example CE router, a need exists for avoiding traffic loss that may be caused when a failure occurs between one or more of the multihomed PE routers and the source of the traffic. The techniques described herein address such a need by, in part, ensuring that traffic loss does not occur in response to one or more of the PE routers not receiving the traffic in response to a failure between the particular PE router and the source device.

To provide an example, envision a scenario where a CE router is multihomed to a first PE router, a second PE router, and a third PE router. To begin, each of the three PE routers may execute an agreed-upon algorithm to determine which of the PE routers is the DF for a particular group (e.g., multicast group). While this example describes a single group, it is to be appreciated that these PE routers may receive traffic associated with an array of different groups and, further, that different ones of the three PE routers may DFs for different ones of the multiple groups. In any event, in this example each of the three PE routers may execute the agreed-upon algorithm to determine that the first PE router is to be the DF for the example group, while the second and third PE routers are to be nDFs.

Thereafter, each of the three PE routers may begin receiving traffic associated with the particular group. The first PE router, playing the DF role, may forward this traffic to the CE router, which in turn may forward the traffic to the destination devices coupled to the CE router that have subscribed to receive the communications associated with the group. The second and third PE routers, meanwhile, may receive these same communications but may refrain from forwarding them to the CE router.

In some instances, however, one or more failures may occur in a network between one or more of the three PE routers and a source of the communications. In these instances, the communications sent by the source might not be received by one or more of the PE routers. As described herein, each of the PE routers may be configured to communicate with its peer PE routers when the respective PE router ceases to the receive the communications, which may, in some instances, result in the remaining PE routers (which are still receiving the communications) again performing the agreed-upon election algorithm for selecting a DF for that particular group, which in turn may result in a different PE router being designated as DF.

Continuing the example from above, for instance, envision that the first PE router, which is currently designated as the DF, ceases to receive the communications associated with the example group. The first PE router may make this determination, for example, in response to not receiving a communication associated with the group within a pre-defined amount of time (e.g., 100 milliseconds, 5 seconds, etc.) In response to determining it is no longer receiving the communications associated with the group, the first PE router may store an indication that it is no longer the DF and send a corresponding message to each of its peer PE devices. For example, the first PE router may "flip" from DF to nDF and may send a message to the second PE router and a message to the third PE router indicating that it is no longer receiving the communications. For example, the first PE router may originate a first route to the second PE router and a second route to the third PE router, with each of these routes indicating that the first PE router is no longer receiving the communications. It is to be appreciated that the message may convey this information by indicating, explicitly, that the first PE router is not receiving the communications, by indicating that the first PE router has flipped from DF to nDF, and/or in any other manner.

In response to receiving a respective instance of this message from the first PE router, each remaining peer PE router (in this case, the second and third PE routers) may again execute the agreed-upon election algorithm for determine which of the remaining PE routers is to become the DF router. Given that each peer PE router is configured to execute the same algorithm, each will come to the same conclusion as to which is to become DF and, thus, which other PE router(s) are to be nDF routers. In this example, envision that both the second and the third PE routers determine that the second PE router is to be the DF router. In response to making this determination, the third PE router may remain in the nDF state. The second DF router, however, may store data indicating that it is now the DF router for this particular group (that is, may "flip" from nDF to DF). The second PE router, operating as the DF, may now begin to forward communications associated with the particular group to the CE router. The third PE router may continue to receive these communications while refraining from forwarding them along to the CE router.

At a later time, however, the failed connection within the network between the first PE router and the source device may be repaired and, thus, the first PE router may again begin receiving communications associated with the group. In response to receiving these communications, the first PE router may inform each of its PE-router peers that it is again receiving the communications, which may result in each of the PE routers again executing the algorithm for selecting a DF router. In one example, the first PE router may inform each of its peer routers by "deleting the route" that it previously originated with the respective peer router. For example, the first PE router may have stored data at the first PE router indicating that it has originated a route to each peer PE router indicating that the first PE router is no longer receiving communications associated with the group. The first PE router may delete this data and send a message to each peer indicating that the first PE router is withdrawing the originated route. In response to the route being removed at each of the second and third PE routers, each of the first, second, and third PE routers may be configured to again run the election algorithm for determining which of the PE routers that are receiving the communications associated with the group (in this case, all three PE routers) is to be the DF router. In this example, the first PE router may again "win" via execution of the algorithm and, thus, may flip from the nDF role back to the DF role. The second router, meanwhile, may flip back from the DF role to the nDF role and may thereafter refrain from forwarding the communications to the CE router. The first PE router, meanwhile, may again begin forwarding the received communications to the CE router, for sending along to the one or more destination devices.

In some instances, however, each peer PE router may cease receiving communications associated with a group, either because the source is no longer sending messages (at least temporarily) or because a failure occurs upstream of each of the PE routers. For example, envision a scenario where each of the first, second, and third PE routers ceases receiving the communications associated with the particular group. In response to making this determination, the first PE router may inform the second and third PE routers that it is no longer receiving the communications, the second PE router may inform the first and third PE routers that it is no longer receiving the communications, and the third PE router may inform the first and second PE routers that it is no longer receiving the communications.

In some instances, the PE routers currently designated as nDF (e.g., the second and third PE routers) may continue on in the nDF role. The PE router currently designated as DF (e.g., the first PE router), meanwhile, may initially flip to nDF upon determining that it is no longer receiving the communications. However, upon receiving the messages (e.g., the routes) indicating that each of the other peer PE routers is also no longer receiving the communications, the DF PE router may be configured to flip back to the DF role, such that a DF still exists even in the scenario that none of the PE routers are receiving the communications. By doing so, the techniques thus ensure that one of the PE routers will begin forwarding the communications if they in fact are eventually received. Further, while the above example describes the DF router flipping to nDF (upon determining that it is not receiving the communications) and then flipping back to DF (upon determining that none of the multihomed PE routers are receiving the communications), in some instances each PE router may be configured to, in response to determining that none of the multihomed PE routers are receiving the communications, again run the election algorithm to determine which PE router is to be the DF router.

If, meanwhile, one of the PE routers begins again receiving the communications, that particular PE router may withdraw the routes that it is has originated. For example, if the second PE router begins receiving communications associated with the group, then the second PE router may withdraw the route it originated with the first PE router and may withdraw the route it created with the third PE router. The second PE router may then flip from nDF to DF, potentially after again running the election algorithm. The first PE router, meanwhile, may flip from DF to nDF, again after potentially running the election algorithm. The third PE router, meanwhile, may remain in the nDF role, potentially after rerunning the election algorithm.

The above techniques thus avoid traffic loss in instances where one or more failures occur within a network between the source of the traffic and one or more multihomed PE routers. It is to be appreciated that while some of the examples are described with reference to multicast traffic, the techniques may apply equally to other types of communications that originate from a source device and are addressed to one or more destination devices (as a group or otherwise). Furthermore, while some of the examples are described with reference to PE routers multihomed to CE routers, it is to be appreciated that the techniques may apply to any other type of computer networking devices within a network.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 in which computer networking devices route traffic, such as multicast traffic, within a provider network 102. The provider network 102 may comprise an array of computer networking devices, such as gateways, routers, network bridges, modems, wireless access points, networking cables, line drivers, switches, hubs, protocol converters, servers, firewalls, network address translators, multiplexers, network interface controllers, wireless network interface controllers, terminal adapters, and/or the like. In some examples, the environment 100 comprises a data center or cloud-computing network comprising servers and other network components (e.g., routers, switches, etc.) stored across multiple data centers located across geographic areas. In these instances, the cloud-computing environment may be a distributed network through which users (often customers) may interact via user devices to manage or otherwise interact with service provided by the cloud computing network. The cloud computing network may provide on-demand availability of computing system resources, such as data storage, computing power (e.g., CPU, GPU, etc.), networking, databases, etc., without direct active management by users. In some examples, the cloud computing network may be managed and maintained by a service provider such that users do not have to invest in and maintain the computing infrastructure for their computing resource needs. Generally, a user may be provided access to, or allocated use of, a portion of the computing resources in the cloud computing network. The cloud computing network may scale, such as by spinning up resources or spinning down resources, based on demand for the individual users. The portions of the cloud computing network may be allocated using hardware virtualization such that portions of the cloud computing network can be configured and managed by the user (e.g., security configuration, load balancing configuration, etc.). However, the cloud computing network need not be managed by a service provider, and can be managed by any entity, including the user themselves that run the applications or services.

As illustrated, one or more source server devices 104 (or "sources 104") may send communication(s) 106 via the provider network 102. In some instances, the communications 106 comprise unicast communications, broadcast communications, multicast communications, and/or any type of communications originating from a source 104 and addressed to one or more receiving computing devices. Also as illustrated, the provider network 102 may receive the communications 106 and forward them along to one or more computer networking devices towards the destination device(s). For example, the communications 106 may be sent to one or more provider routers 108, one or more provider-edge routers 110, and/or the like. It is to be appreciated, of course, that while several devices are illustrated, the provider network 102 may further include an array of other devices. In some instances, the PE routers 110 comprise several PE routers 110(1), 110(2), . . . , 110(N) that are multihomed to one or more customer-edge (CE) routers 112. Each CE router 112, may communicatively couple to one or more destination computing devices 114.

In some instances, one or more destination devices 114 may have subscribed to receive certain communications, such as communications associated with a specified group of computing devices (e.g., a multicast group). In these examples, the source 104 may send the communications 106 to the provider router 108, which may send copies of the communications 106 to each of the PE routers 110(1)-(N). As described above, one of the PE routers 110(1)-(N) may be deemed, at any given moment, as the DF router that is responsible for sending the communications to the CE router 112, which in turns sends the communications 106 to the subscribing destination devices 114. In this example, the PE router 110(1) is currently designed as the DF router and, thus, forward, the communications to the CE router 112. The PE routers 110(2)-(N), meanwhile, are currently designed as nDF routers and, thus, receive the communications but do not forward them to the CE router 112. As noted above, however, it is to be appreciated that each device group (e.g., multicast group) may be associated with a different DF router, such that each of the PE routers 110(2)-(N) may be deemed DF routers for other communications associated with other groups. For clarity, however, FIG. 1 describes the routing of communications 106 associated with a single group and, thus, a single DF at any given time.

Within the environment of FIG. 1, the communications 106 are routed to the CE router 112 (and, thus, to the destination devices 114) via the DF router, which in this case is PE router 110(1). If, however, a failure occurs in the connection between the PE router 110(1) and the source 104, the PE routers 110 may be configured to communicate with one another and change which of the PE routers 110 functions as the DF in order to avoid traffic loss at the CE router and, thus, the destination devices 114.

As illustrated with reference to the PE router 110(N), each of the PE routers 110 thus includes one or more hardware processors 116 and memory (e.g., non-transitory computer-readable media) storing logic for avoiding traffic loss in the event of a failure within the provider network 102 between the source 104 and the PE routers. The processors 116 may be configured to execute one or more stored instructions and may comprise one or more cores. The memory 118, meanwhile may store one or more operating systems that generally support basic functions of the respective PE router, as well as a DF-determination component 120 for determining which of the peer PE routers 110 is to be the DF router at any given.

The DF-determination component may include a DF-election component 122, a communication component 124, a route-creation component 126, and a route-deletion component 128. The DF-election component 122 may be configured to execute an agreed-upon election algorithm for determining which of the peer PE routers 110 is to fill the DF role for a particular communication group (e.g., multicast group) at any given time. It is to be appreciated that each of the PE routers may store an instance of the DF-election component 122 (and other components of the DF-determination component 120) such that each peer PE router makes a common determination regarding which PE router is to act as the DF. Further, each peer PE router may be configured, via the component 122, to rerun the agreed-upon election algorithm in response to determine predefined triggers, as described below.

The communication component 124, meanwhile, may function to receive communications from source devices, such as the communications 106 from the source 104. Further, the communications component 124 may determine when the respective PE router, such as the PE router 110(N) has not received communications 106 associated with a particular for a predefined amount of time (e.g., 500 milliseconds, 5 seconds, etc.).

In response to determining that the PE router 110(N) has not received the communications 106 within the predefined amount of time, the PE router 110 may be configured to notify each of its peer PE routers 110. For example, in the illustrated example, the PE router 110(N) may be configured to notify the PE routers 110(1) and 110(2). Further, upon again receiving the communications 106, each PE router may be configured to again notify each other peer PE router, as described below. It is to be appreciated, however, that while the following discussion provides an example of how each peer PE router may notify each other PE router, other notification techniques may be employed.

In some instances, the route-creation component 126 creates a route with each of its PE-router peers in response to the PE router 110(N) determining that it is no longer receiving the communications 106. For example, the PE router 110(N) may generate a route to each of the PE router 110(1) and 110(2) indicating that the PE router 110(N) has ceased receiving the communications 106. The route-deletion component 128, meanwhile, may function delete or withdraw each originated route in response to determining that the PE router 110(N) has again begun receiving the communications 106.

FIGS. 2A-D collectively illustrate a flow diagram of a process 200 for ensuring that traffic, such as multicast traffic, reaches a CE router that is multihomed to at least first and second PE routers 110(1) and 110(2). It is to be appreciated that the while FIGS. 2A-D, as well as FIGS. 3A-D, are described with reference to two peer PE routers, the techniques apply equally to any other number of peer PE routers multihomed to a common CE router.

At an operation 202, the first PE router 110(1) runs an election algorithm for determining whether the first PER router 110(1) or the second PE router 110(2) is to act as the DF for a particular group, such as a particular multicast group, unicast group, broadcast group, or the like. In some instances, the DF-election component 122, discussed above, executes an agreed-upon algorithm that is also being executed by each other peer PE router.

At an operation 204, the first PE router 110(1) determines, based on executing the algorithm at the operation 202, that the first PE router 110(1) ("PE1") is the DF for the particular group and, at an operation 206, the first PE router 110(1) stores data indicating that the first PE router 110(1) is to act as the DF. Stated otherwise, the first PE router 110(1) creates an entry in memory indicating that it is responsible for forwarding, to at least one receiving device, communications addressed to a specified group of computing devices. In some instances, the receiving device(s) may comprise a CE router or another type of computer networking device configured to forward the communications to the specified group of computing devices, while in other instances the receiving device(s) may comprise one or more of the computing devices (i.e., the destination computing devices that have subscribed to receive the communications). Furthermore, the communications may comprise messages addressed to a particular IP multicast group or any other message(s) addressed to a group of one or more computing devices.

At an operation 208, meanwhile, the second PE router 110(2) may also run the agreed-upon election algorithm and, at an operation 210, may also determine that the first PE router 110(1) is to be the DF for this device group. Thus, at an operation 212, the second PE router 110(2) ("PE2") may store data indicating that it is to be an nDF router for this device group. Stated otherwise, the second PE router 110(2) may store data indicating that it is not responsible for forwarding the communications to the at least one receiving device.

At an operation 214, meanwhile, the first PE router 110(1) may begin receiving multicast communications associated with the multicast group for which the first PE router 110(1) is currently designated as DF. Thus, at an operation 216, the first PE router 110(1) may forward the received multicast communications along to at least one receiving device, such as a CE router that couples to one or more computing devices that have subscribed to the multicast group. Again, while this example describes multicast communications, it is to be appreciated that the communications may comprise unicast, broadcast, and/or any other type of communication originating from a source and addressed to one or more computing devices. At an operation 218, meanwhile, the second PE router 110(2) also receives the same multicast communications associated with the multicast group. However, given that the second PE router 110(2) is currently designated as nDF for this multicast group, the second PE router 110(2) refrains from forwarding the communications to the receiving device.

Figure 2A:
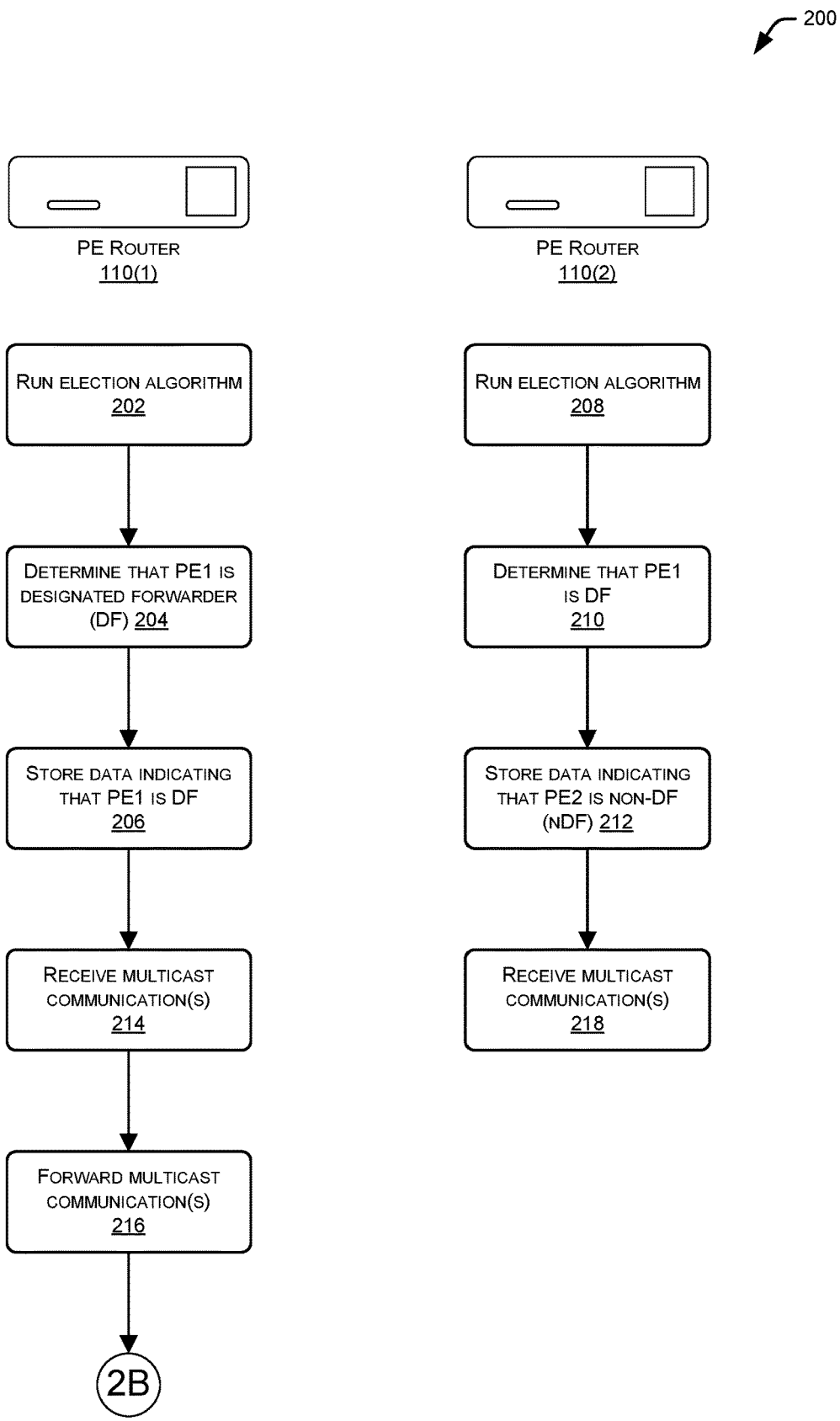
FIGS. 2A-D collectively illustrate a flow diagram of a process for ensuring that traffic, such as multicast traffic, reaches a CE router that is multihomed to at least first and second PE routers. For example, the first PE router may be initially designated as a designated forwarder (DF) for a particular group (e.g., multicast group), resulting in the second PE router being a non-DF (nDF). However, in response to the first PE router determining that it is not receiving traffic from a source of the group, the first PE router may notify the second PE router, which in turn may designate itself as DF for the particular group to ensure that the CE router receives the traffic.
Figure 2B:
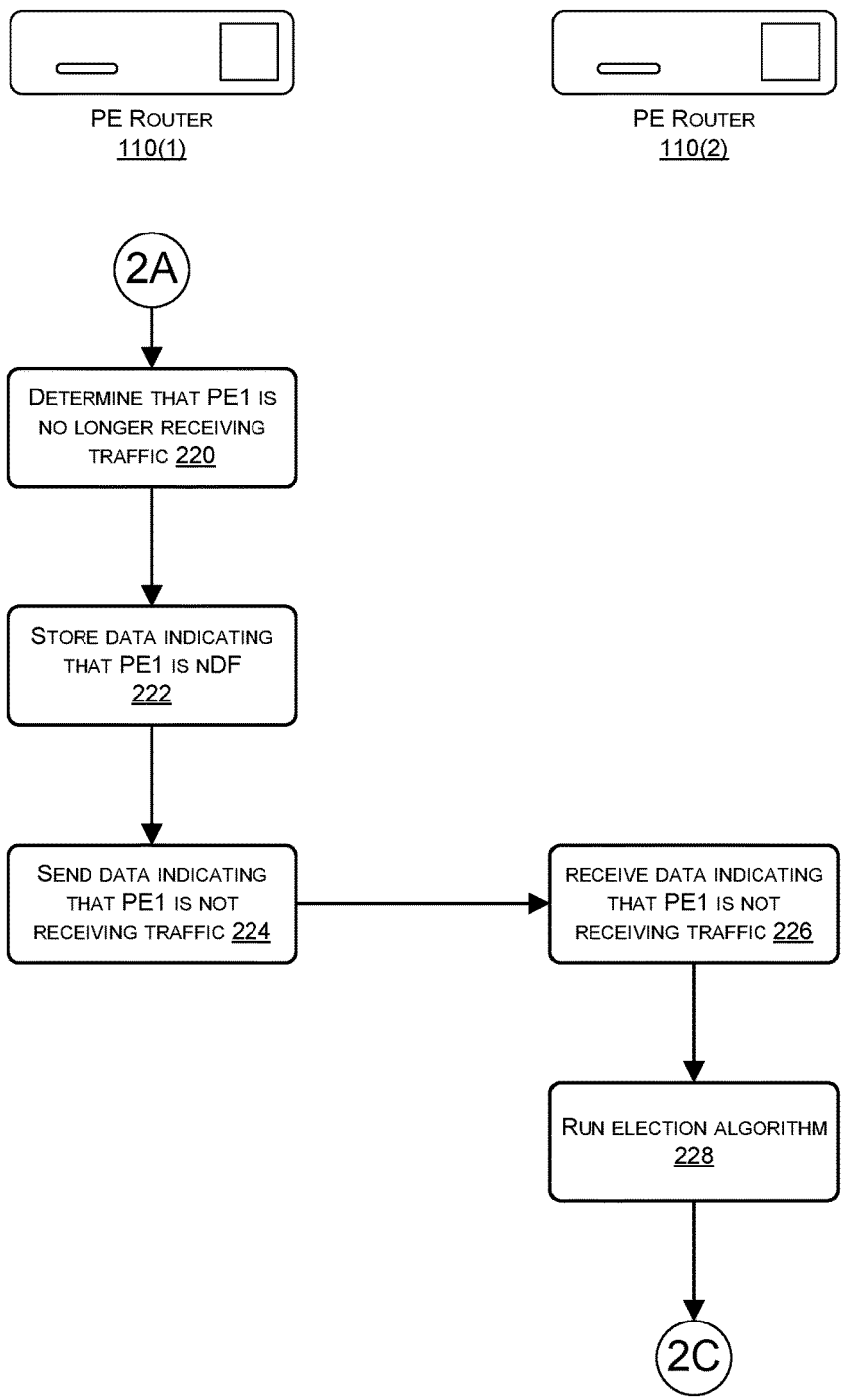

FIG. 2B continues the illustration of the process 200 and includes, at an operation 220, the first PE router 110(1) determining that it is no longer receiving the multicast communications associated with the multicast group. For example, an instance of the communication component executing on the first PE router 110(1) may determine the communications associated with this multicast group have not been received within a threshold amount of time. In response, at an operation 222, the first PE router 110(1) may store data indicating that the first PE router 110(1) is now an nDF router for this multicast group. That is, the first PE router 110(1) may store data indicating that it is no longer responsible for forwarding the communications to the receiving device(s), such as the CE router.

Further, at an operation 224, the first PE router 110(1) may send data indicating that the first PE router 110(1) is not receiving the multicast traffic. For example, an instance of the route-creation component 126 executing on the first PE router 110(1) may originate a route to the second PE router 110(2) indicating that the first PE router 110(1) is no longer receiving traffic associated with an identified multicast group.

At an operation 226, the second PE router 110(2) may receive the data indicating that the first PE router 110(1) is no longer receiving traffic associated with the specified multicast group. In response to receiving this indication, at an operation 228 the second PE router 110(2) may again run the election algorithm to determine which of the peer PE routers is to now act as DF for the specified multicast group. While this example describes again running the election algorithm, it is to be appreciated that the second PE router 110(2) may also automatically flip from nDF to DF (without running the algorithm) in instances where the first PE router 110(1) is the only other peer PE router and/or instances where the second PE router 110(2) determines (e.g., via respective originated routes) that each peer PE router other than the second PE router 110(2) is no longer receiving traffic associated with the specified multicast group.

Figure 2C:
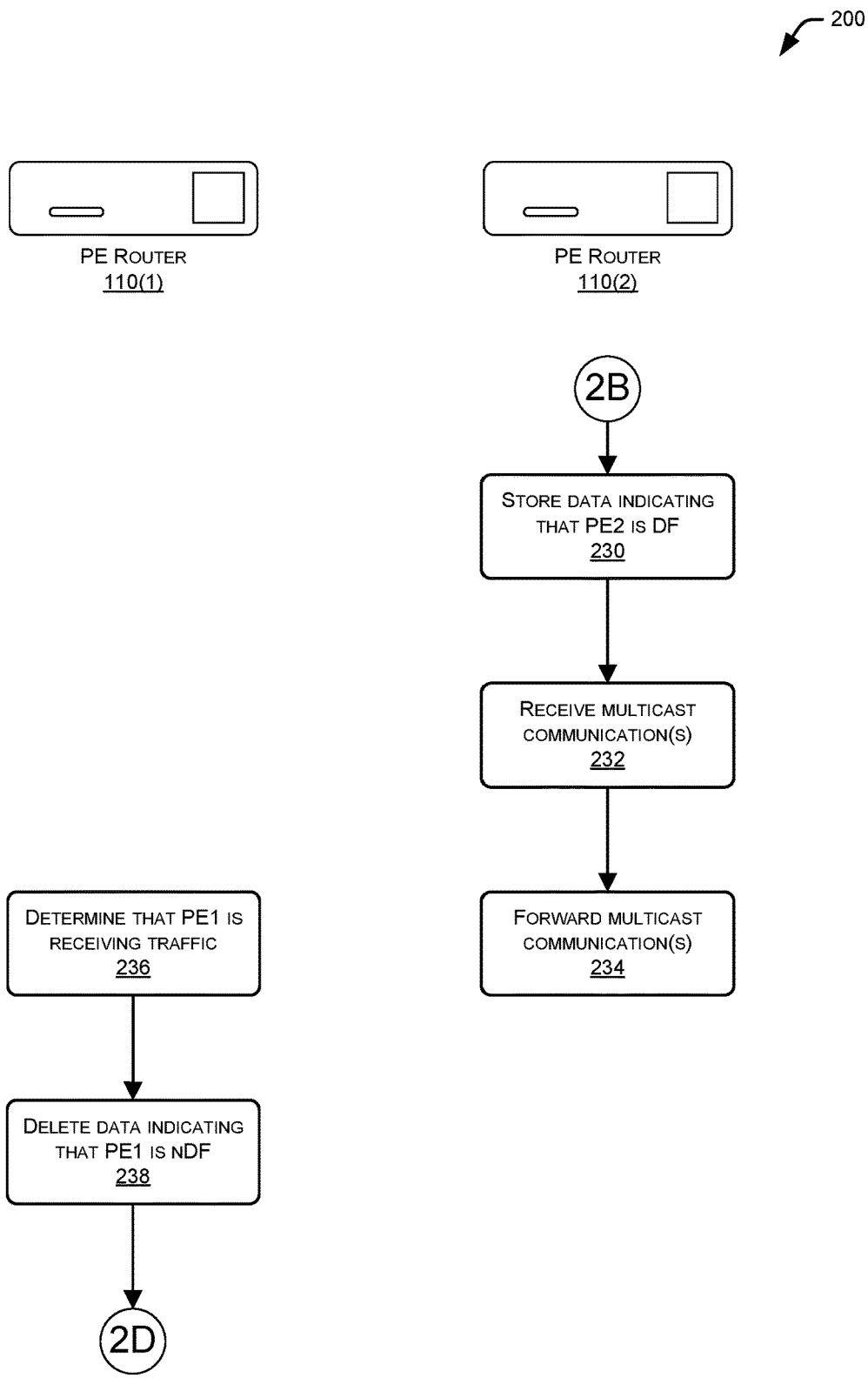

FIG. 2C continues the illustration of the process 300 and includes, at an operation 230, the second PE router 110(2) storing data indicating that it is now occupying the role of DF for the multicast group. That is, the second PE router 110(2) may store data indicating it is now responsible for forwarding the communications to the receiving device(s). At an operation 232, the second PE router 110(2) receives such communications and, given that the second PE router 110(2) is now the DF, the second PE router 110(2) forwards these communications to the receiving device(s) at an operation 234.

At an operation 236, meanwhile, the first PE router 110(1) may determine the it is now receiving traffic associated with the particular multicast group. For example, whatever failure that occurred between the source of the multicast group and the first PE router 110(1) may have been repaired, resulting in the first PE router 110(1) receiving subsequent communications. In response, at an operation 238, the first PE router 110(1) may delete the data indicating that it is an nDF router. That is, the first PE router 110(1) may delete the data indicating that no longer responsible for forwarding the communications to the receiving device(s). For example, the first PE router 110(1) may delete an entry that the first PE router 110(1) stored in memory after creating the route with the second PE router 110(2).

Figure 2D:
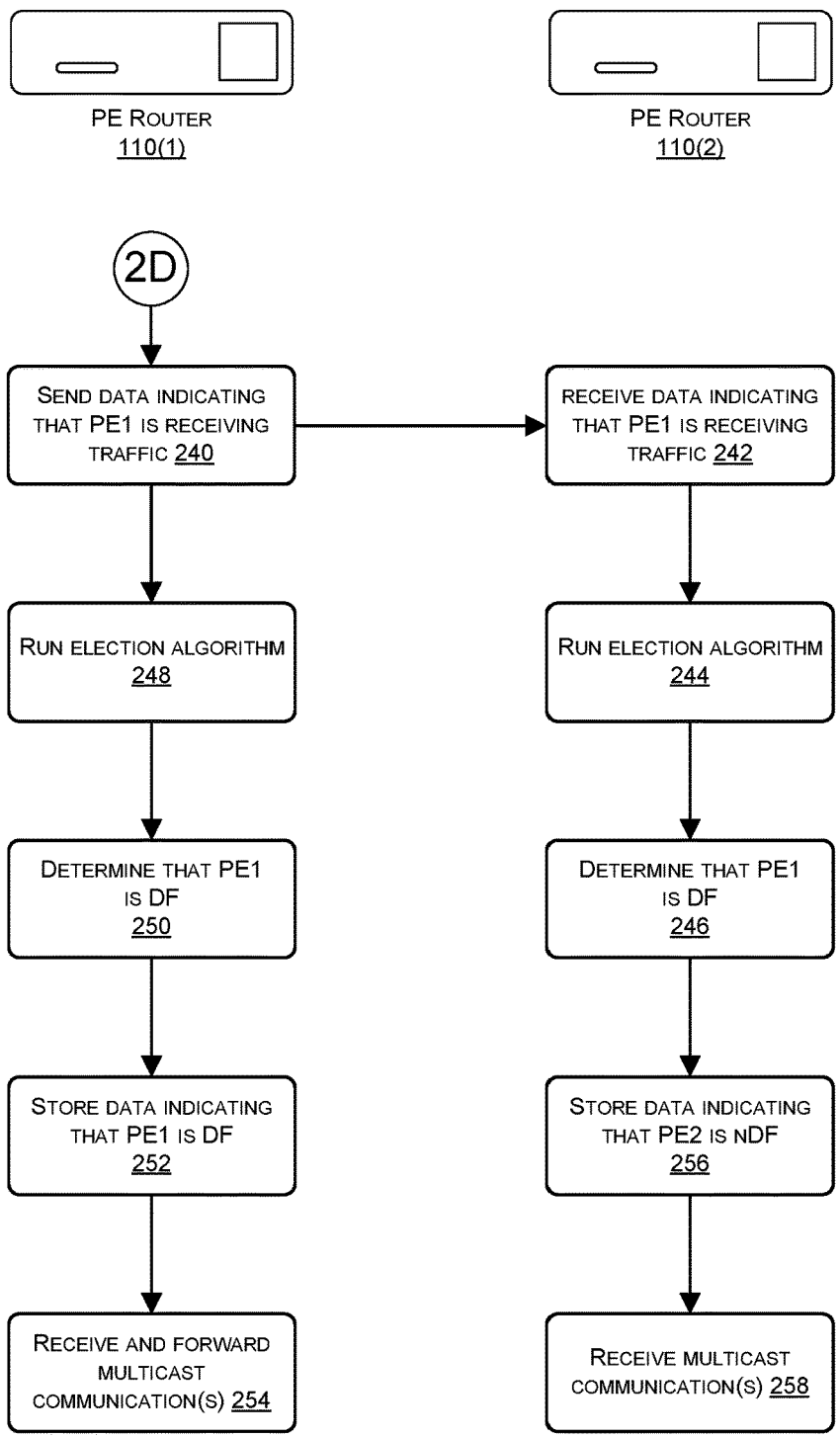

FIG. 2D concludes the illustration of the process 200 and includes, at an operation 240, the first PE router 110(1) sending data indicating that the first PE router 110(1) is again receiving traffic associated with the multicast group. In some instances, an instance of the route-deletion component 128 executing on the first PE router 110(1) may send this data by withdrawing the route created at the operation 224. For example, the first PE router 110(1) may send data indicating that the first PE router 110(1) has deleted the entry that the first PE router 110(1) generated upon originating the route with the second PE router 110(2).

At an operation 242, the second PE router 110(2) receives the data indicating that the first PE router 110(1) is again receiving traffic. For example, the second PE router 110(2) may receive the indication that the first PE router 110(1) has withdrawn the route that it originated the operation 224. In response, at an operation 244, the second PE router 110(2) may again run the election algorithm to determine which PE router is to now act as the DF. At an operation 246, the second PE router 110(2) determines, based on the executing of the algorithm, that the first PE router 110(1) is again to act as DF.

At an operation 248, meanwhile, the first PE router 110(1) may also re-run the election algorithm and, at an operation 250, may determine that it is to again act as the DF. At an operation 252, the first PE router 110(1) may again store data indicating that it is to act as DF—that is, that it is again responsible for forwarding received communications associated with the multicast group to the receiving device(s). At an operation 254, the first PE router 110(1) thus receives subsequent multicast communications and forward these communications to the receiving devices).

The second PE router 110(2), meanwhile, may store, at an operation 256, data indicating that it is to again act as an nDF router. Thus, at an operation 258, the second PE router 110(2) receives the multicast communications but refrains from forwarding them to the receiving device(s).

FIGS. 3A-D collectively illustrate a flow diagram of an process 300 for ensuring that traffic, such as multicast traffic, reaches a CE router that is multihomed to at least first and second PE routers in instances where both the first and second PE routers are not receiving from a source of a particular group (e.g., a multicast group). In these instances, the PE routers may each execute an agreed-upon election algorithm for selecting a DF until one of the PE routers begins receiving the traffic, at which point that PE router may transition to the DF role with the PE router previously designated as DF may transition to an nDF role.

At an operation 302, the first PE router 110(1) runs an election algorithm for determining whether the first PER router 110(1) or the second PE router 110(2) is to act as the DF for a particular group, such as a particular multicast group, unicast group, broadcast group, or the like. In some instances, the DF-election component 122, discussed above, executes an agreed-upon algorithm that is also being executed by each other peer PE router.

At an operation 304, the first PE router 110(1) determines, based on executing the algorithm at the operation 302, that the first PE router 110(1) ("PE1") is the DF for the particular group and, at an operation 306, the first PE router 110(1) stores data indicating that the first PE router 110(1) is to act as the DF. Stated otherwise, the first PE router 110(1) creates an entry in memory indicating that it is responsible for forwarding, to at least one receiving device, communications addressed to a specified group of computing devices. As noted above, in some instances, the receiving device(s) may comprise a CE router or another type of computer networking device configured to forward the communications to the specified group of computing devices, while in other instances the receiving device(s) may comprise one or more of the computing devices (i.e., the destination computing devices that have subscribed to receive the communications). Furthermore, the communications may comprise messages addressed to a particular IP multicast group or any other message(s) addressed to a group of one or more computing devices.

At an operation 308, meanwhile, the second PE router 110(2) may also run the agreed-upon election algorithm and, at an operation 310, may also determine that the first PE router 110(1) is to be the DF for this device group. Thus, at an operation 312, the second PE router 110(2) ("PE2") may store data indicating that it is to be an nDF router for this device group. Stated otherwise, the second PE router 110(2) may store data indicating that it is not responsible for forwarding the communications to the at least one receiving device.

At an operation 314, meanwhile, the first PE router 110(1) may begin receiving multicast communications associated with the multicast group for which the first PE router 110(1) is currently designated as DF. Thus, at an operation 316, the first PE router 110(1) may forward the received multicast communications along to at least one receiving device, such as a CE router that couples to one or more computing devices that have subscribed to the multicast group. Again, while this example describes multicast communications, it is to be appreciated that the communications may comprise unicast, broadcast, and/or any other type of communication originating from a source and addressed to one or more computing devices. At an operation 318, meanwhile, the second PE router 110(2) also receives the same multicast communications associated with the multicast group. However, given that the second PE router 110(2) is currently designated as nDF for this multicast group, the second PE router 110(2) refrains from forwarding the communications to the receiving device.

Figure 3A:
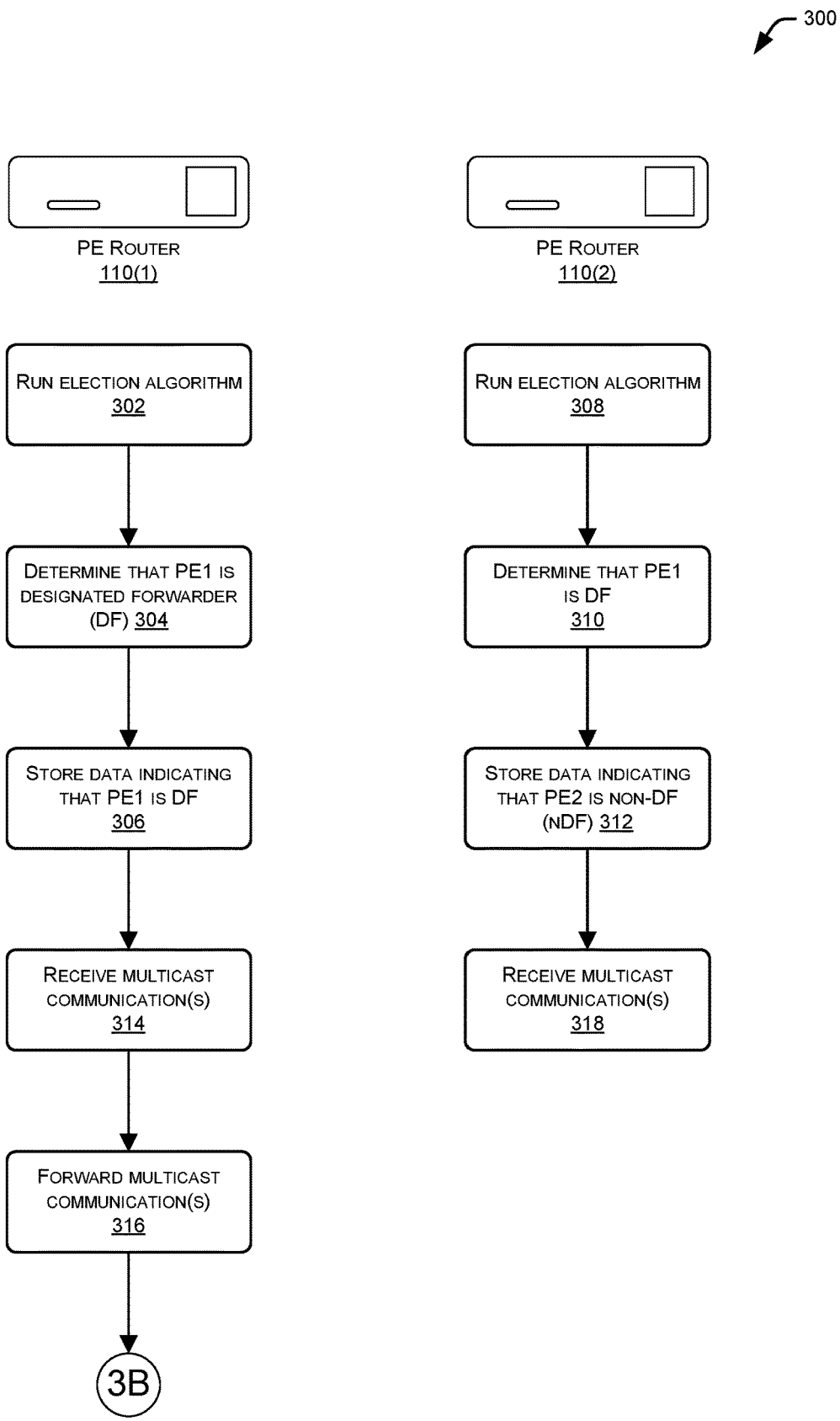
FIGS. 3A-D collectively illustrate a flow diagram of a process for ensuring that traffic, such as multicast traffic, reaches a CE router that is multihomed to at least first and second PE routers in instances where both the first and second PE routers are not receiving from a source of a particular group (e.g., a multicast group). In these instances, the PE routers may each execute an agreed-upon election algorithm for selecting a DF until one of the PE routers begins receiving the traffic, at which point that PE router may transition to the DF role with the PE router previously designated as DF may transition to an nDF role.
Figure 3B:
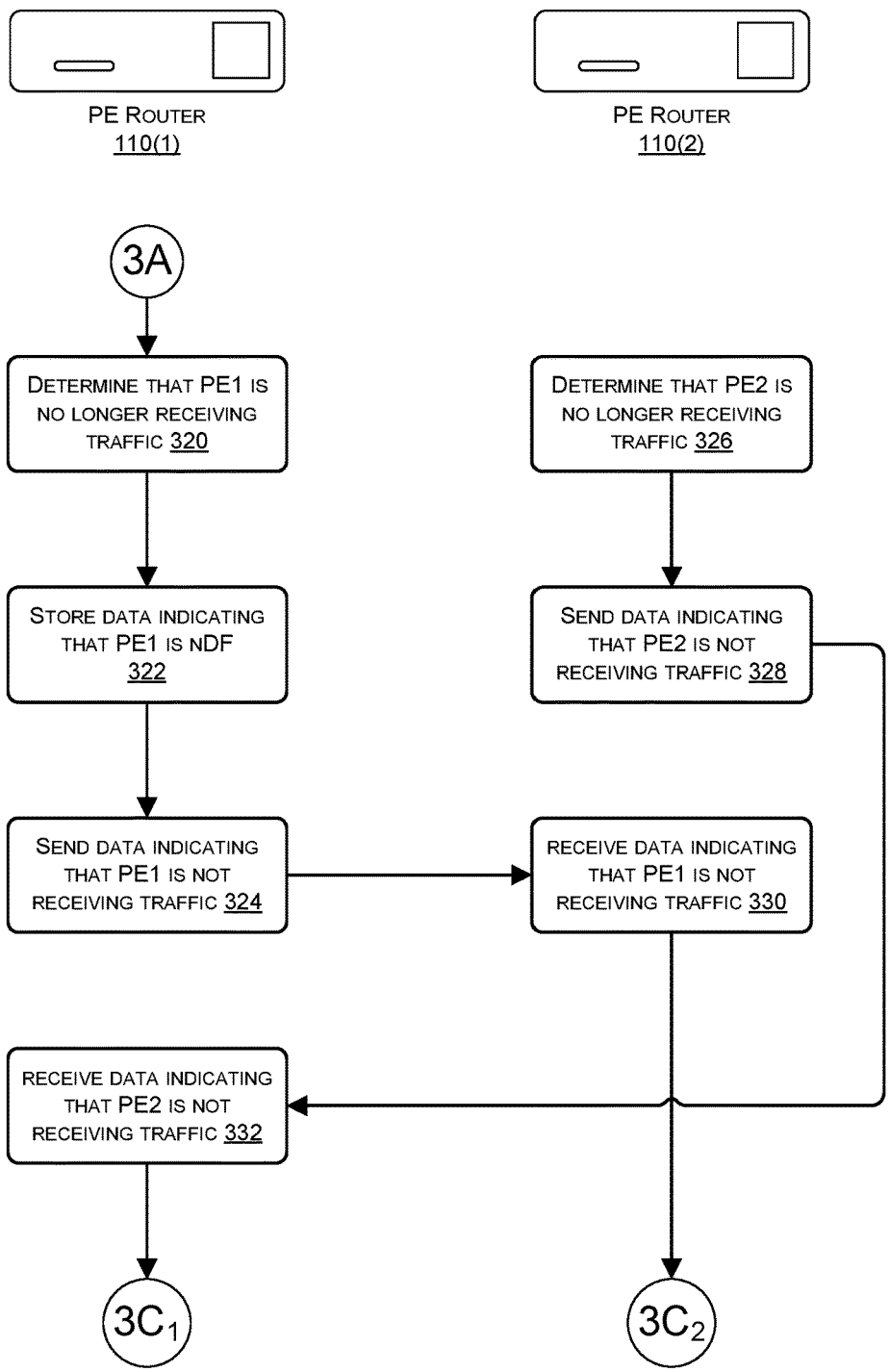

FIG. 3B continues the illustration of the process 300 and includes, at an operation 320, the first PE router 110(1) determining that it is no longer receiving the multicast communications associated with the multicast group. For example, an instance of the communication component executing on the first PE router 110(1) may determine the communications associated with this multicast group have not been received within a threshold amount of time. In response, at an operation 322, the first PE router 110(1) may store data indicating that the first PE router 110(1) is now an nDF router for this multicast group. That is, the first PE router 110(1) may store data indicating that it is no longer responsible for forwarding the communications to the receiving device(s), such as the CE router.

Further, at an operation 324, the first PE router 110(1) may send data indicating that the first PE router 110(1) is not receiving the multicast traffic. For example, an instance of the route-creation component 126 executing on the first PE router 110(1) may originate a route to the second PE router 110(2) indicating that the first PE router 110(1) is no longer receiving traffic associated with an identified multicast group.

At an operation 326, meanwhile, the PE router 110(2) may also determine that it is no longer receiving the multicast communications associated with the multicast group.

For example, an instance of the communication component executing on the second PE router 110(2) may determine the communications associated with this multicast group have not been received within a threshold amount of time. In response, at an operation 328, the second PE router 110(2) may send data indicating that the second PE router 110(2) is not receiving the multicast traffic. For example, an instance of the route-creation component 126 executing on the second PE router 110(2) may originate a route to the first PE router 110(1) indicating that the second PE router 110(2) is no longer receiving traffic associated with an identified multicast group.

At an operation 330, the second PE router 110(2) may receive the data indicating that the first PE router 110(1) is no longer receiving traffic associated with the specified multicast group. Further, at an operation 322, the first PE router 110(1) may receive the data indicating that the second PE router 110(2) is no longer receiving traffic associated with the specified multicast group.

Figure 3C:
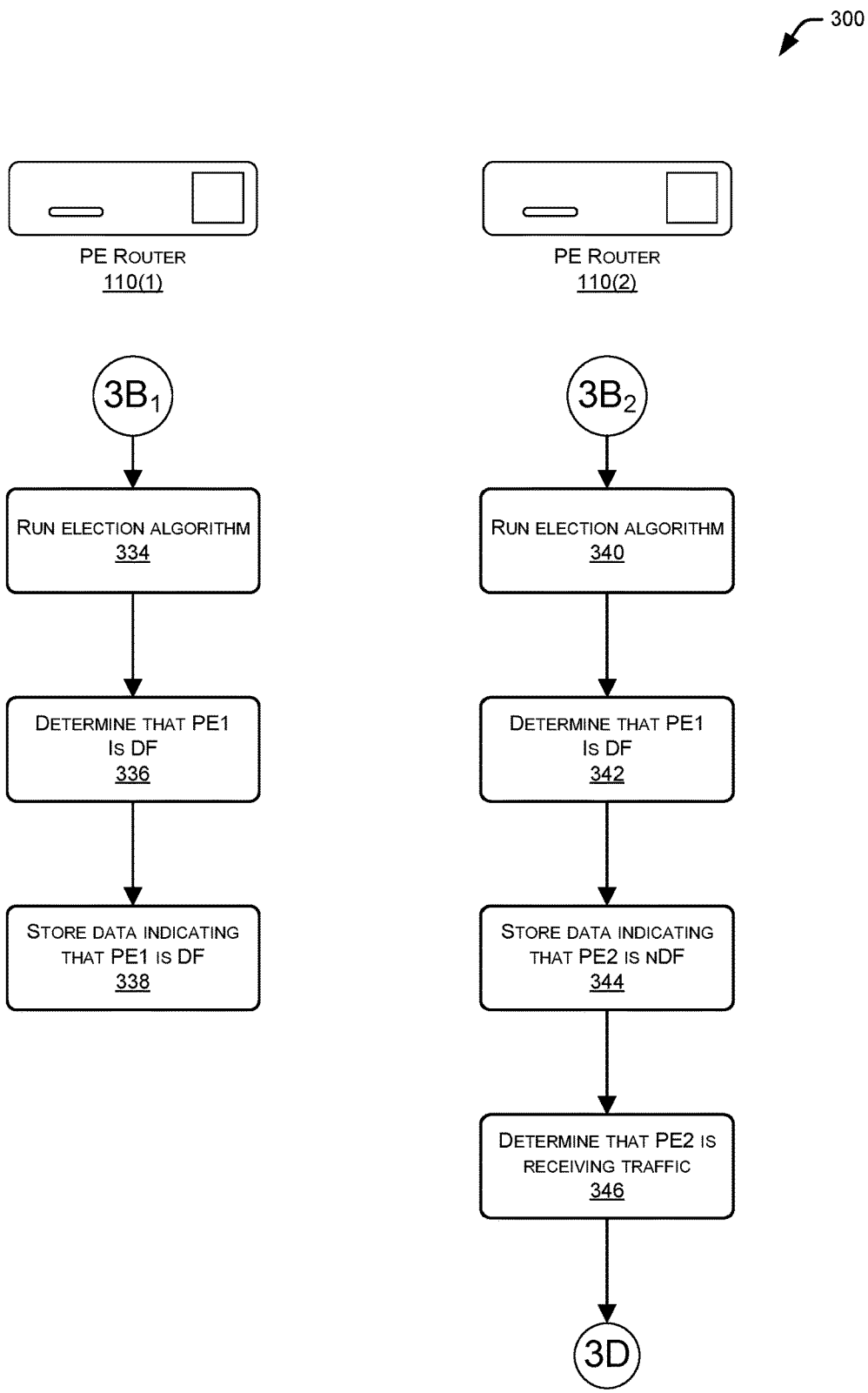

FIG. 3C continues the illustration of the process 300 and includes, at an operation 334, first PE router 110(1) again running the election algorithm to determine which of the peer PE routers is to now act as DF for the specified multicast group. That is, because the PE router 110(1) has determined that each other peer PE router (in this case, the second PE router 110(2)) is also not receiving the communications, each peer PE router may be configured to run the election algorithm to ensure that one of the peer PE routers remains a DF, in the event that traffic is again received. It is noted, meanwhile, the while this process 300 describes running the election algorithm to determine the DF in these instances, in other examples other techniques may be used to determine the DF, such as automatically selecting as DF the PE router that was previously the DF (in this case, the first PE router 110(1)).

At an operation 336, meanwhile, the first PE router 110(1) determines that it is to again be the DF and, at an operation 338, stores data indicating that it is again the DF. At an operation 340, the second PE router 110(2) also re-runs the election algorithm and, at an operation 342, determines that the first PE router 110(1) is to be the DF. As such, at an operation 344, the second PE router 110(2) stores data indicating that it remains an nDF router.

At an operation 346, however, the second PE router 110(2) may determine that it is now receiving traffic associated with the multicast group. That is, the second PE router 110(2) may determine that has begun receiving the communications after sending data to its peer PE routers (in this case, the first PE router 110(1)) indicating that the second PE router 110(2) is not receiving the communications and after receiving an indication from the first PE router 110(1) that it also is not receiving the communications.

Figure 3D:
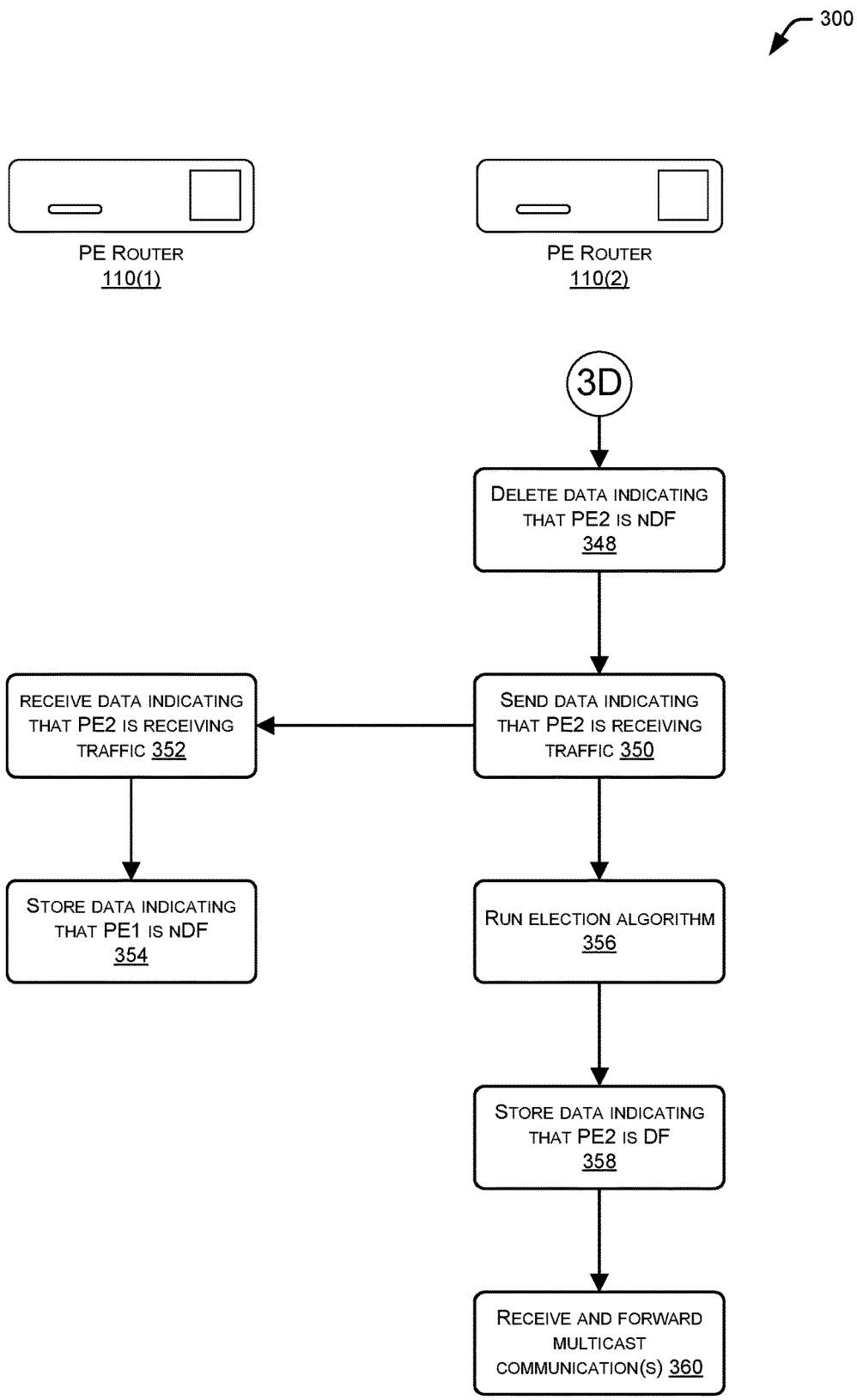

FIG. 3D concludes the illustration of the process 300 and includes, at an operation 348, the second PE router 110(2) deleting the data indicating that it is an nDF router and, at an operation 350, sending data to the first PE router 110(1) indicating the second PE router 110(2) is again receiving the traffic. For example, the second PE router 110(2) may send data to withdraw the route that it created with the first PE router 110(1).

At an operation 352, the first PE router 110(1) may receive the data indicating that the second PE router 110(2) is again receiving the multicast traffic. In response, at an operation 354, the first PE router 110(1) may store data indicating that it is not an nDF router. That is, the first PE router may flip from DF to nDF, such that the first router 110(1) will not forward subsequent communications to receiving device(s) associated with the multicast group, should the first PE router 110(1) begin again receiving these communications.

At an operation 356, the second PE router 110(2) may again run the election algorithm to determine that is to be the DF and, at an operation 358 may store data indicating that it is to be the DF router for this multicast group. As noted above, however, in some instances the second PE router 110(2) may refrain from running the algorithm but may instead automatically flip from nDF to DF in response to again receiving traffic prior to having any of its peer PE routers remove a respective route. That is, in instances where the second PE router 110(2) determines that it is the only peer PE router receiving traffic for this multicast group, it may automatically take over the role of DF. Regardless, at an operation 360, the second PE router 110(2) may continue receiving the multicast communications and forward them along to the receiving device(s).

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 2A-D and 3A-D, and as described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

Figure 4:
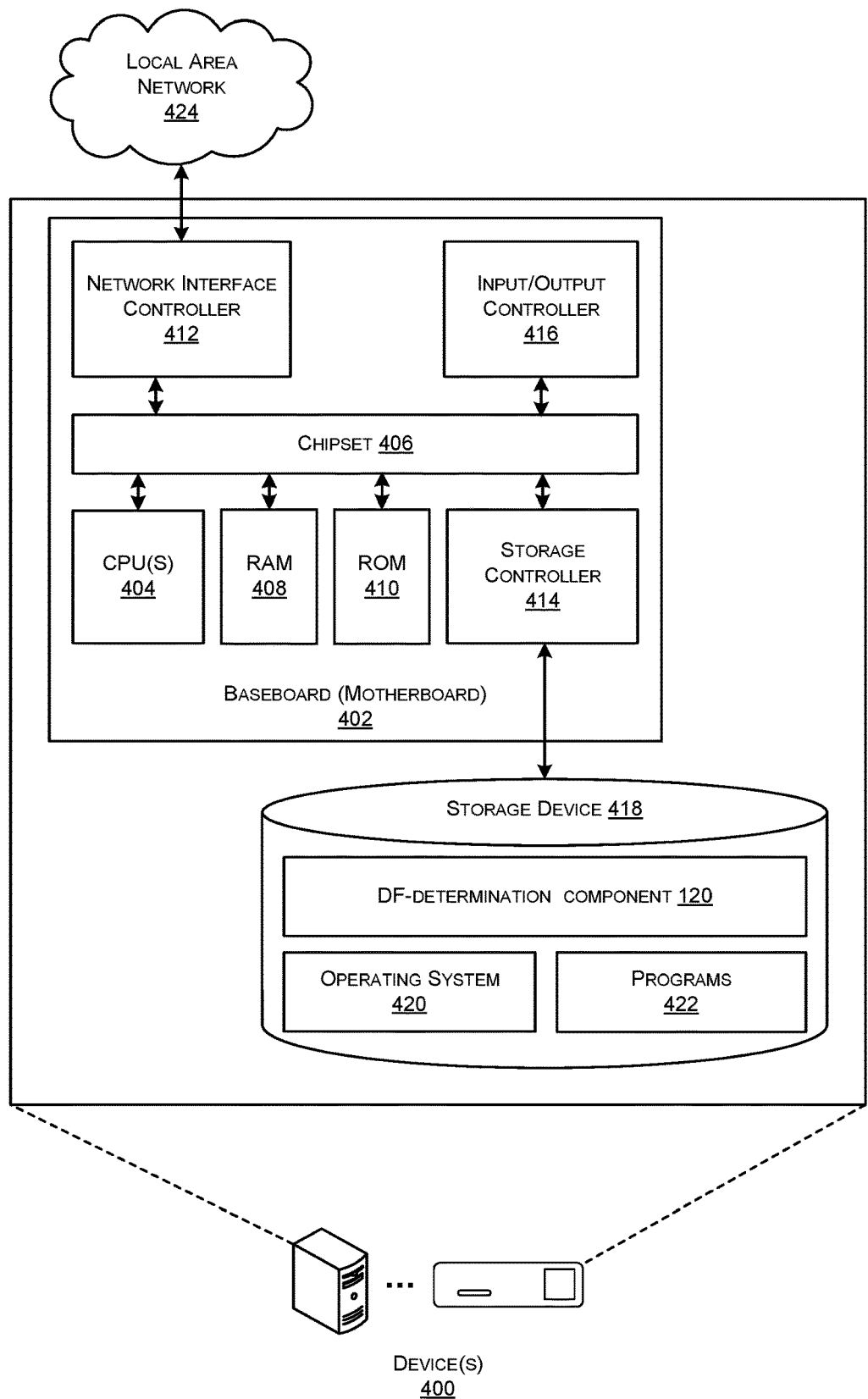
FIG. 4 is a computer architecture diagram showing an illustrative computer hardware architecture for implementing devices, such as computer networking devices, configured to implement the techniques described herein.

FIG. 4 is a computer architecture diagram showing an illustrative computer hardware architecture for implementing a device 400 that can be utilized to implement aspects of the various technologies presented herein. The source servers 104, the provider router 108, the PE routers 110, the CE routers, and/or the destination devices 114, discussed above, may include some or all of the components discussed below with reference to the device 400.

As mentioned above, the computing resources provided by a cloud computing network, data center, or the like can be data processing resources such as VM instances or hardware computing systems, database clusters, computing clusters, storage clusters, data storage resources, database resources, networking resources, and others. Some of the devices 400 can also be configured to execute a resource manager capable of instantiating and/or managing the computing resources. In the case of VM instances, for example, the resource manager can be a hypervisor or another type of program configured to enable the execution of multiple VM instances on a single server device 400. Devices 400 in a data center can also be configured to provide network services and other types of services.

The device 400 includes a baseboard 402, or "motherboard," which is a printed circuit board to which a multitude of components or devices can be connected by way of a system bus or other electrical communication paths. In one illustrative configuration, one or more central processing units (CPUs) 404 operate in conjunction with a chipset 406. The CPUs 404 can be standard programmable processors that perform arithmetic and logical operations necessary for the operation of the device 400.

The CPUs 404 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 406 provides an interface between the CPUs 404 and the remainder of the components and devices on the baseboard 402. The chipset 406 can provide an interface to a RAM 408, used as the main memory in the device 400. The chipset 406 can further provide an interface to a computer-readable storage medium such as a read-only memory (ROM) 410 or non-volatile RAM (NVRAM) for storing basic routines that help to startup the device 400 and to transfer information between the various components and devices. The ROM 410 or NVRAM can also store other software components necessary for the operation of the device 400 in accordance with the configurations described herein.

The device 400 can operate in a networked environment using logical connections to remote computing devices and computer systems through a network, such as a local area network 424. The chipset 406 can include functionality for providing network connectivity through a Network Interface Card (NIC) 412, such as a gigabit Ethernet adapter. The NIC 412 is capable of connecting the device 400 to other computing devices over the network. It should be appreciated that multiple NICs 412 can be present in the device 400, connecting the computer to other types of networks and remote computer systems.

The device 400 can be connected to a storage device 418 that provides non-volatile storage for the computer. The storage device 418 can store an operating system 420, programs 422, and data, which have been described in greater detail herein. The storage device 418 can be connected to the device 400 through a storage controller 414 connected to the chipset 406. The storage device 418 can consist of one or more physical storage units. The storage controller 414 can interface with the physical storage units through a serial attached SCSI (SAS) interface, a serial advanced technology attachment (SATA) interface, an FC interface, or other type of interface for physically connecting and transferring data between computers and physical storage units.

The device 400 can store data on the storage device 418 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 418 is characterized as primary or secondary storage, and the like.

For example, the device 400 can store information to the storage device 418 by issuing instructions through the storage controller 414 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The device 400 can further read information from the storage device 418 by detecting the physical states or characteristics of one or more particular locations within the physical storage units.

In addition to the mass storage device 418 described above, the device 400 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 400.

By way of example, and not limitation, computer-readable storage media can include volatile and non-volatile, removable and non-removable media implemented in any method or technology. Computer-readable storage media includes, but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 418 can store an operating system 420 utilized to control the operation of the device 400. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 418 can store other system or application programs and data utilized by the device 400.

In one embodiment, the storage device 418 or other computer-readable storage media is encoded with computer-executable instructions which, when loaded into the device 400, transform the computer from a general-purpose computing system into a special-purpose computer capable of implementing the embodiments described herein. These computer-executable instructions transform the device 400 by specifying how the CPUs 404 transition between states, as described above. According to one embodiment, the device 400 has access to computer-readable storage media storing computer-executable instructions which, when executed by the device 400, perform the various processes described above with regard to FIGS. 2A-3D. The device 400 can also include computer-readable storage media having instructions stored thereupon for performing any of the other computer-implemented operations described herein.

The device 400 can also include one or more input/output controllers 416 for receiving and processing input from a number of input devices, such as a keyboard, a mouse, a touchpad, a touch screen, an electronic stylus, or other type of input device. Similarly, an input/output controller 416 can provide output to a display, such as a computer monitor, a flat-panel display, a digital projector, a printer, or other type of output device. It will be appreciated that the device 400 might not include all of the components shown in FIG. 4, can include other components that are not explicitly shown in FIG. 4, or might utilize an architecture completely different than that shown in FIG. 4.

The device 400 may also store, in the storage device 418, the DF-determination component 120 for performing some or all of the techniques described above with reference to FIGS. 1-3C.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A first computer networking device, comprising:
   one or more processors; and
   one or more non-transitory computer-readable media storing computer-executable instructions that, when executed by the one or more processors, cause the one or more processors to perform acts comprising:
   executing an election algorithm for determining whether at least the first computer networking device, a second computer networking device, or a third computer networking device is responsible for forwarding, to at least one receiving device, communications addressed to a specified group of computing devices;
   storing first data indicating that the first computer networking device is responsible for forwarding the communications to the at least one receiving device;
   determining that the first computer networking device is not receiving the communications;
   storing second data indicating that the first computer networking device is no longer responsible for forwarding the communications to the at least one receiving device;
   sending, to the second computer networking device, third data indicating that the first computer networking device is not receiving the communications; and
   sending, to the third computer networking device, fourth data indicating that the first computer networking device is not receiving the communications.

2. The first computer networking device as recited in claim 1, the acts further comprising:
   determining, after the storing of the second data, that the first computer networking device is receiving the communications;
   deleting the second data; and
   sending, to the second computer networking device, fifth data indicating the first computer networking device has deleted the second data.

3. The first computer networking device as recited in claim 1, the acts further comprising:
   determining, after the storing of the second data, that the first computer networking device is receiving the communications;
   deleting the second data;
   sending, to the second computer networking device, fifth data indicating the first computer networking device has deleted the second data;
   again executing the election algorithm for determining whether at least the first computer networking device, the second computer networking device, or the third computer networking device is responsible for forwarding the communications to the at least one receiving device; and
   storing sixth data indicating that the first computer networking device is responsible for forwarding the communications to the at least one receiving device.

4. The first computer networking device as recited in claim 1, the acts further comprising:
   receiving, from the second computer networking device, fifth data indicating that the second computer networking device is not receiving the communications;
   again executing the election algorithm for determining whether at least the first computer networking device, the second computer networking device, or the third computer networking device is responsible for forwarding the communications to the at least one receiving device; and
   storing sixth data indicating that the first computer networking device is responsible for forwarding the communications to the at least one receiving device.

5. The first computer networking device as recited in claim 4, the acts further comprising:
   receiving, from the second computer networking device, seventh data indicating that the second computer networking device is now receiving the communications; and
   storing eighth data indicating that the first computer networking device is no longer responsible for forwarding the communications to the at least one receiving device.

6. The first computer networking device as recited in claim 1, wherein the communications addressed to the specified group of computing devices comprise multicast communications addressed to an internet-protocol (IP) multicast group, wherein each computing device of the specified group of computing devices has subscribed to the IP multicast group.

7. A first computer networking device, comprising:
   one or more processors; and
   one or more non-transitory computer-readable media storing computer-executable instructions that, when executed by the one or more processors, cause the one or more processors to perform acts comprising:
   executing an election algorithm for determining whether at least the first computer networking device or a second computer networking device is responsible for forwarding, to at least one receiving device, communications addressed to a specified group of computing devices;
   storing first data indicating that the first computer networking device is not responsible for forwarding the communications to the at least one receiving device;

receiving, from the second computer networking device, second data indicating that the second computer networking device is not receiving the communications;

storing third data indicating that the first computer networking device is now responsible for forwarding the communications to the at least one receiving device;

receiving, from the second computer networking device, fourth data indicating that the second computer networking device is now receiving the communications; and storing fifth data indicating that the first computer networking device is no longer responsible for forwarding the communications to the at least one receiving device.

8. The first computer networking device as recited in claim 7, the acts further comprising:

again executing the election algorithm for determining whether at least the first computer networking device or the second computer networking device is responsible for forwarding the communications to the at least one receiving device;

and wherein the storing the third data is based at least in part on the again executing of the election algorithm.

9. The first computer networking device as recited in claim 7, the acts further comprising:

again executing the election algorithm for determining whether at least the first computer networking device or the second computer networking device is responsible for forwarding the communications to the at least one receiving device;

and wherein the storing the fifth data is based at least in part on the again executing of the election algorithm.

10. The first computer networking device as recited in claim 7, the acts further comprising:

determining that the first computer networking device is not receiving the communications;

sending, to the second computer networking device, sixth data indicating that the first computer networking device is not receiving the communications; and again executing the election algorithm for determining whether at least the first computer networking device or the second computer networking device is responsible for forwarding the communications to the at least one receiving device.

11. The first computer networking device as recited in claim 7, wherein the communications addressed to the specified group of computing devices comprise multicast communications addressed to an internet-protocol (IP) multicast group, wherein each computing device of the specified group of computing devices have subscribed to the IP multicast group.

12. A method comprising:

executing, at a first computer networking device, an election algorithm for determining whether at least the first computer networking device, a second computer networking device, or a third computer networking device is responsible for forwarding, to at least one receiving device, communications addressed to a specified group of computing devices;

storing first data indicating that the first computer networking device is responsible for forwarding the communications to the at least one receiving device;

determining that the first computer networking device is not receiving the communications;

storing second data indicating that the first computer networking device is no longer responsible for forwarding the communications to the at least one receiving device;

sending, from the first computer networking device and to the second computer networking device, third data indicating that the first computer networking device is not receiving the communications; and sending, from the first computer networking device and to the third computer networking device, fourth data indicating that the first computer networking device is not receiving the communications.

13. The method as recited in claim 12, further comprising:

determining, after the storing of the second data, that the first computer networking device is receiving the communications;

deleting the second data; and sending, to the second computer networking device, fifth data indicating the first computer networking device has deleted the second data.

14. The method as recited in claim 12, further comprising:

determining, after the storing of the second data, that the first computer networking device is receiving the communications;

deleting the second data;

sending, to the second computer networking device, fifth data indicating the first computer networking device has deleted the second data;

again executing the election algorithm for determining whether at least the first computer networking device, the second computer networking device, or the third computer networking device is responsible for forwarding the communications to the at least one receiving device; and storing sixth data indicating that the first computer networking device is responsible for forwarding the communications to the at least one receiving device.

15. The method as recited in claim 12, further comprising:

receiving, from the second computer networking device, fifth data indicating that the second computer networking device is not receiving the communications;

again executing the election algorithm for determining whether at least the first computer networking device, the second computer networking device, or the third computer networking device is responsible for forwarding the communications to the at least one receiving device; and storing sixth data indicating that the first computer networking device is responsible for forwarding the communications to the at least one receiving device.

16. The method as recited in claim 15, further comprising:

receiving, from the second computer networking device, seventh data indicating that the second computer networking device is now receiving the communications; and storing eighth data indicating that the first computer networking device is no longer responsible for forwarding the communications to the at least one receiving device.

17. The method as recited in claim 12, wherein the communications addressed to the specified group of computing devices comprise multicast communications addressed to an internet-protocol (IP) multicast group, wherein each computing device of the specified group of computing devices has subscribed to the IP multicast group.

* * * * *